United States Patent
Mattur et al.

(10) Patent No.: US 7,039,747 B1
(45) Date of Patent: May 2, 2006

(54) SELECTIVE SMART DISCARDS WITH PREFETCHABLE AND CONTROLLED-PREFETCHABLE ADDRESS SPACE

(75) Inventors: Dattatri N. Mattur, Sunnyvale, CA (US); Sampath Hosahally Kumar, San Jose, CA (US); Udayakumar Srinivasan, Milpitas, CA (US); Madhu Rao, San Jose, CA (US); Abhay Ujwal Bhorkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 10/742,185

(22) Filed: Dec. 18, 2003

(51) Int. Cl.
*G06F 13/36* (2006.01)
*G06F 12/00* (2006.01)

(52) U.S. Cl. .................. 710/310; 710/300; 711/137
(58) Field of Classification Search ............. 710/310, 710/305, 306, 100, 110, 52; 711/137, 160, 711/146; 713/324; 709/259
See application file for complete search history.

(56) References Cited

U.S. PATENT DOCUMENTS

| | | | | |
|---|---|---|---|---|
| 5,566,324 A | * | 10/1996 | Kass | 711/160 |
| 5,664,117 A | * | 9/1997 | Shah et al. | 710/100 |
| 5,815,677 A | * | 9/1998 | Goodrum | 710/310 |
| 5,884,027 A | * | 3/1999 | Garbus et al. | 709/250 |
| 5,983,306 A | * | 11/1999 | Corrigan et al. | 710/310 |
| 6,170,030 B1 | * | 1/2001 | Bell | 710/310 |
| 6,173,410 B1 | * | 1/2001 | Bondi et al. | 713/324 |
| 6,286,074 B1 | * | 9/2001 | Batchelor et al. | 710/305 |
| 6,490,647 B1 | * | 12/2002 | Batchelor et al. | 710/310 |
| 6,502,154 B1 | * | 12/2002 | Meredith et al. | 710/305 |
| 6,539,458 B1 | * | 3/2003 | Holmberg | 711/137 |
| 6,578,102 B1 | * | 6/2003 | Batchelor et al. | 710/310 |
| 6,581,129 B1 | * | 6/2003 | Buckland et al. | 710/306 |
| 6,601,144 B1 | * | 7/2003 | Arimilli et al. | 711/146 |
| 6,662,251 B1 | * | 12/2003 | Brock et al. | 710/110 |
| 6,665,753 B1 | * | 12/2003 | Buckland et al. | 710/52 |
| 6,792,496 B1 | * | 9/2004 | Aboulenein et al. | 710/306 |
| 6,820,161 B1 | * | 11/2004 | Perez | 710/306 |
| 2003/0079089 A1 | * | 4/2003 | Barrick et al. | 711/137 |
| 2003/0221039 A1 | * | 11/2003 | Bronson et al. | 710/306 |
| 2004/0205298 A1 | * | 10/2004 | Bearden et al. | 711/137 |
| 2004/0243767 A1 | * | 12/2004 | Cierniak et al. | 711/137 |

\* cited by examiner

*Primary Examiner*—Rehana Perveen
*Assistant Examiner*—Christopher E. Lee
(74) *Attorney, Agent, or Firm*—Marger Johnson & McCollom, P.C.

(57) ABSTRACT

A bridging device has a first port to allow the device to communicate with other devices on an expansion bus and a second port to allow the device to communicate with devices on a second bus. The device also includes a memory to store data and a processor or logic to prefetch data upon request from a device on the expansion bus, tag any remaining prefetched data with an identifier upon a disconnecting event, and retain the prefetched data until a discarding event occurs. A method of controlling prefetch transactions on an expansion bus involves prefetching data across a primary bus for a device on a secondary bus. An indication that a disconnecting event has occurred is detected and any remaining prefetched data remaining is tagged with an identifier and retained. The data may be prefetched from a controlled prefetch region in the memory.

14 Claims, 4 Drawing Sheets

SELECTIVE SMART DISCARDS WITH PREFETCHABLE AND CONTROLLED-PREFETCHABLE ADDRESS SPACE

BACKGROUND

Many computer systems rely upon expansion busses to add functionality to the overall system. Generally, the added functionality takes the form of small printed circuit boards or other types of 'cards' that have on them the necessary components to allow the main processor to communicate with other devices. For example, video cards, audio cards, and network interface cards all provide added functionality to the system. The cards may communicate over an expansion bus, rather than being included on the main system bus.

Expansion busses are generally one of two types, an ISA (Industry Standard Architecture) bus or a PCI (Peripheral Component Interconnect) bus. The ISA standard was used initially, but became a bottleneck as processor speeds increased. Typically, most computer systems now employ PCI busses, or busses similar to PCI-X (PCI eXtended). The device that connects the PCI bus to the main system bus is usually referred to as a PCI bridge.

Expansion cards communicate with the CPU across the expansion bus. When the CPU needs an expansion device, such as a network interface card, to transmit data, it sets up a transmit ring in the memory to direct the device to the data to be transmitted by writing data descriptors to the transmit ring. The CPU then writes to a device control register set up in the system memory for the expansion device that will transmit the data. When the CPU wants to notify the device of its pending task, it will do so through the PCI bridge. The device then fetches one or more of the descriptors in a single PCI transaction (PCI burst) and then generally one packet at a time until the entire data to be transmitted is fetched. The device then transmits the data as requested by the CPU.

When there are multiple devices that need to communicate with the CPU, multiple expansion busses may be used. When multiple busses exist in a system, there may be PCI bridges that bridge between the busses. These types of bridges are often referred to a PCI-to-PCI bridges, or P2P bridges. For ease of discussion, the term PCI bridge will be used to refer to both PCI and P2P bridges.

PCI bridges may 'read ahead' of a transaction, or 'prefetch' data from the system memory with the idea being that having the data available to the device at the PCI bridge, rather than in the system memory, would speed up the data transfer from the memory to the device. As this is currently implemented, though, it provides some benefit, but not as much as it could. If the device disconnects from the bridge for whatever reason, the bridge flushes the prefetched data, and no net gain in speed is made. In addition, the data will have to be read again, increasing the load on the memory system, as the same data is being read twice instead of once.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
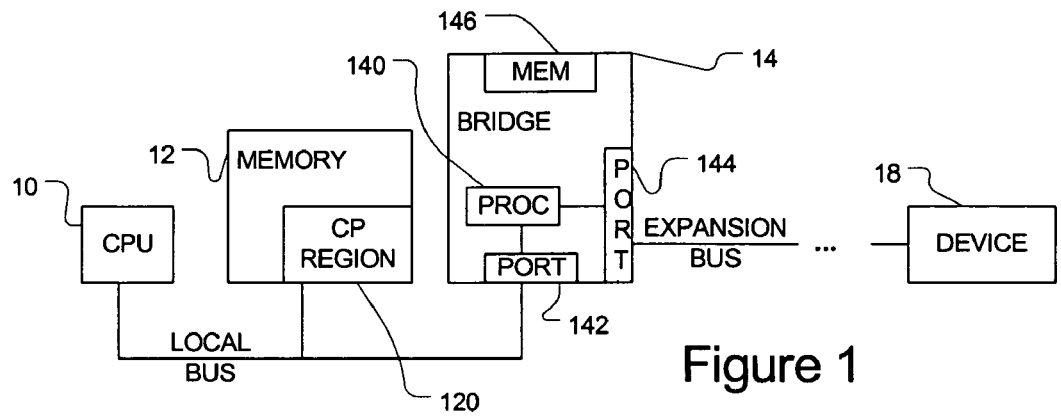
FIG. 1 shows an example of a system architecture employing a bridge.

FIG. 1 shows an example of a system architecture employing a bridge. The central processing unit (CPU) 10 and the system memory 12 reside on the system or local bus 100. Also residing on the system bus 100 is the bridging device 14. The bridging device 14 may be peripheral components interconnect (PCI) bridge. In the example of FIG. 1, there is only one expansion bus 102. In some instances there may be multiple expansion busses and the bridge device may be a PCI-to-PCI (P2P) bridge. Similarly, there is only one device 18 on the expansion bus, but other devices may also be on the bus and employ similar methods as disclosed here.

For ease of discussion, when the device is accessing the memory or interacting with the CPU, through the bridge, this will be referred to as the upstream direction. When the CPU is interacting with the device, through the bridge, this will be referred to as the downstream direction. It must be noted that the communications between the device and the CPU or the memory will be through the bridge, even if not stated.

Turning to the memory 12, it can be seen that there is a defined "CP Region" 120. The CP Region is the controlled prefetchable region designated by the CPU, memory controller or system controller. The exact entity that sets out the dimension of this region is left up to the system designer, but may be descriptor tables or shared memory for interprocessor communication. As will be discussed in more detail further, the CP region is a region designated by a start address and a limit address in which data to be prefetched resides. When the device accesses data in the CP region, the bridge will not prefetch from the memory more than the configured prefetch size. The prefetch size for the CP region will be programmable. This focuses on downstream transactions between the device and the memory.

Similarly it is possible to see that the bridge 14 has a processor 140 that may be a microcontroller, general purpose CPU, digital signal processor or any other device that can manage the functions of the device in handling communications between the bridge and the CPU through port 142 and between the bridge and the device on port 144. In addition, the bridge may have a memory 146 for functions that will be discussed in detail below.

Initially, the discussion will focus on downstream transactions, in which the CPU notifies the device that data is ready for it. Generally, the CPU sets up a descriptor ring in the memory, to which it will write the addresses of the data to be fetched for a given write to the device. In addition, there is a device control register for each device, to which the CPU writes to notify the device of a pending transaction. In the case of a network interface device, these transactions are either transmit or receive requests that are set up in the corresponding descriptors.

As mentioned previously, when the device receives an indication that there is data to be read from the main memory, it first makes a read request to the bridge to fetch the descriptors for the data. After fetching a descriptor, the device gets the address and length of the data from the descriptor. Upon reading the descriptor, the device makes another read request to the bridge to fetch the data using the address in the descriptor read. The bridge then begins to fetch the data requested by the device, to have it available for the device when needed. Upon fetching the data from the memory, the bridge then starts pre-fetching additional data from the memory so that it is available for additional read requests from the device. The bridge prefetches a configured amount of data from the memory.

Typically devices have some limited amount of buffer in them for absorbing a burst of data from the bridge. This buffer size may be smaller than the prefetch buffer size in the bridge. So before reading all the prefetched data from the bridge, the device may disconnect the read transaction. Currently, the bridge flushes any remaining prefetched data upon a discarding event. As used here, the term discarding event refers to any event that would cause a bridge to discard any remaining prefetched data. Examples include a device disconnect from the device side, CPU access to the device, and the expiration of a discard timer.

As an example of a device disconnect, assume that the device needs to transmit a 350-byte packet from the system memory. The device, as is common with many devices, can only support a short burst of 32 bytes, after which it disconnects. If the bridge fetches 128 bytes, the device takes 32 bytes of that in a burst and then disconnects. Upon disconnect, the bridge discards the remaining 96 bytes. When the device requests its next burst, the bridge fetches another 128 bytes, of which the device only retrieves 32 bytes. The 32 bytes the device takes have now been prefetched twice. The third 32 bytes will have been prefetched three times and the final 32 bytes of the first 128 byte prefetch will have been prefetched 4 times before it actually makes it to the device.

A 350 byte packet in 32 byte bursts requires 11 (350/32) prefetch cycles. Within those prefetches, most 32-byte segments will be fetched multiple times before being sent to the device. The device suffers from latency all the way back to the system memory for each fetch. If the bridge could retain the 96 bytes of the 128 byte prefetch, each 32-byte segment would only be fetched once from memory, and the number of accesses between the bridge and the main memory would reduce to 3 main memory access cycles (350/128). This also reduces the latency, as the device is accessing the data from the bridge, rather than from the memory.

Figure 2:
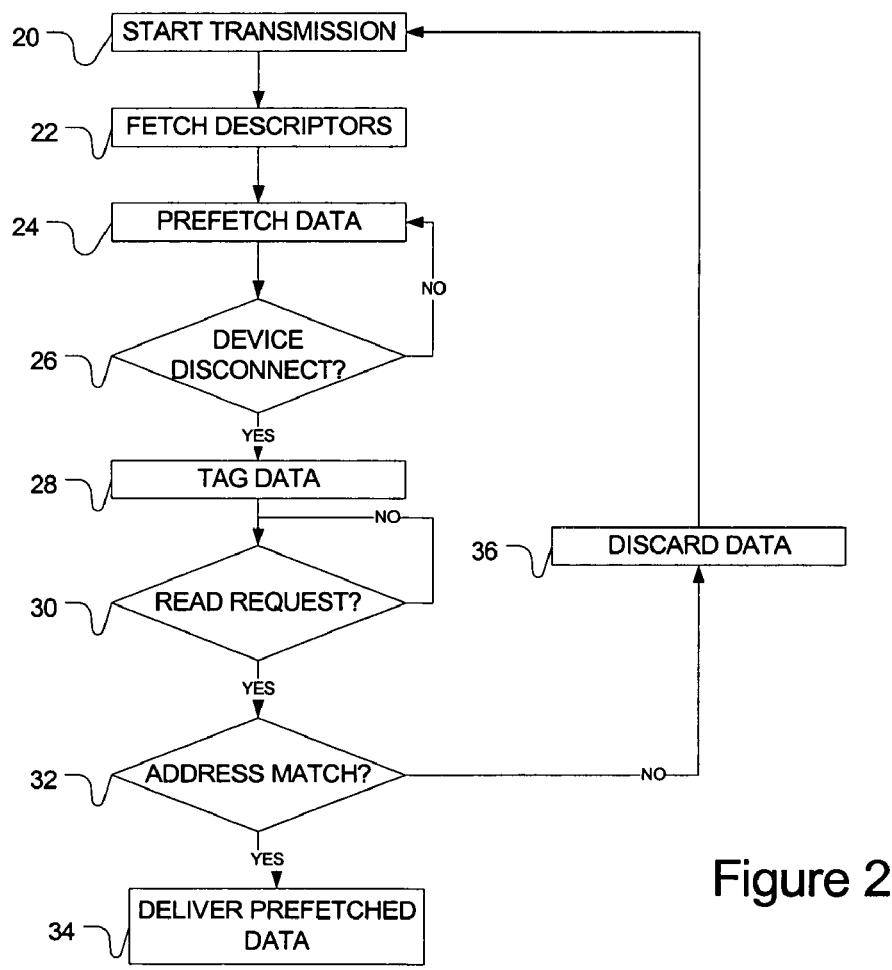
FIG. 2 shows a flowchart of an embodiment of a method for smart discard of prefetched data.

An embodiment of a method to improve the prefetch process with selective smart discarding is shown in FIG. 2. The transmission starts with the CPU writing to the device control register at 20. The device then fetches the descriptors at 22, and gets the data address and length. It then makes a read request to the bridge to read data. The bridge then begins to prefetch data and deliver it to the device at 24. If the device disconnects at 26, then any remaining prefetched data is tagged with an identifier at 28 to allow the bridge to identify it as being part of the prefetch for that device. In the case of only one device being on that particular expansion bridge, the bridge only needs to tag the data with the start address of the remaining data.

The tagged data is then retained until a discarding event occurs. One concern in storing data in the bridge is the possibility that the data will become stale. Stale data would be the data that no longer matches the data in the memory at the same memory location. For example, if the CPU were to write to the data addresses from which the data was prefetched, the data in the main system memory has changed and the data in the bridge has not. The data in the bridge would then be considered stale.

In one embodiment of the invention, a read request from the device received at the bridge triggers an inquiry. When the read request is received at 30, the bridge determines if the address of the read request matches the start address of the data remaining from the previous prefetch at 32. If the address matches, the current read request is a continuation of the previous read request and the bridge can continue to deliver the prefetched data at 34. If the address does not match, the data is discarded at 36 and the process then returns to prefetching data at 24.

This approach works because the device has to alternate fetching descriptors and fetching packets. When it starts a fetch that does not match the start address of the remaining prefetched data, the device has moved on to the next read request. When the device fetches descriptors, it causes the bridge to flush any stale prefetched data and when it fetches packets it causes the bridge to flush any stale prefetched descriptors.

Figure 3:
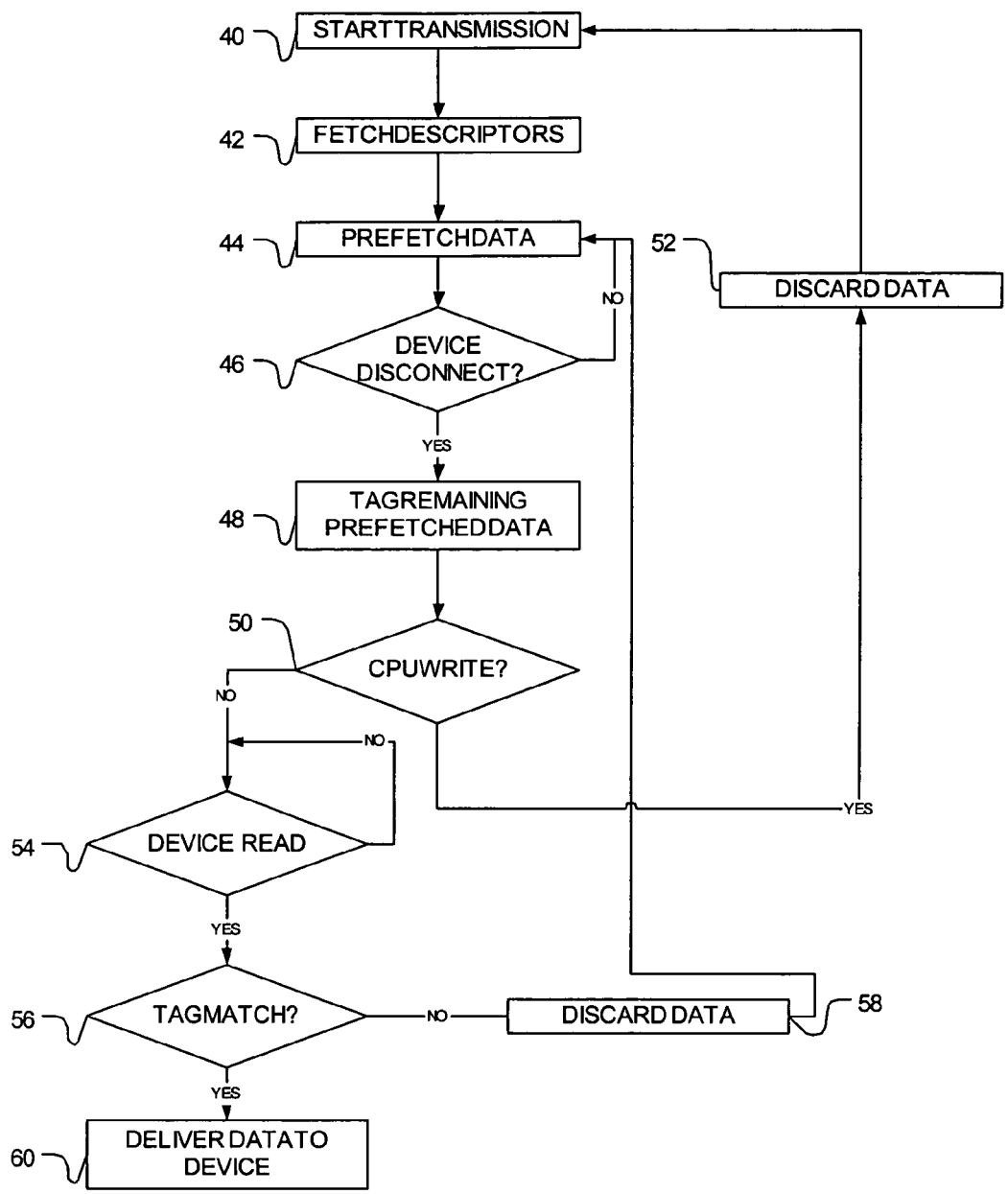
FIG. 3 shows a flowchart of another embodiment of a method for smart discard of prefetched data.

An alternative selective smart discard embodiment is shown in flowchart form in FIG. 3. The transmission starts at 40. The device fetches descriptors through the bridge at 42 and the bridge begins to prefetch data at 44. If the device disconnects at 46, the data is again tagged with an identifier at 48. In the case of one device on the expansion bus, the data is tagged with a start address of the remaining prefetched data. This data is then retained until a discarding event occurs.

While a discarding event is any event that indicates that the data in the bridge is stale, in this embodiment the discarding event is shown as a write from the primary CPU at 50. In the case of there being only one device on the expansion bus, any write from the CPU will be destined for that device for which the bridge had previously fetched data. This means that the data currently being prefetched or residing in the bridge is stale.

In the flowchart, if the CPU does not perform a write request, the process determines if the device performs a read at 54. If the tags match at 56, the data is delivered to the device at 60. If the tag does not match, the data is discarded at 58, as the read process will indicate that the data in the bridge has become stable.

In addition, the data could be discarded as a matter of course when any device on the bridge receives a write/read indication from the CPU when there is more than one device on the expansion bus. While this is not necessarily an indication that the device for which the data had prefetched is being written to, it avoids having to further analyze the request or requiring any more information to be included in the tag.

Figure 4:
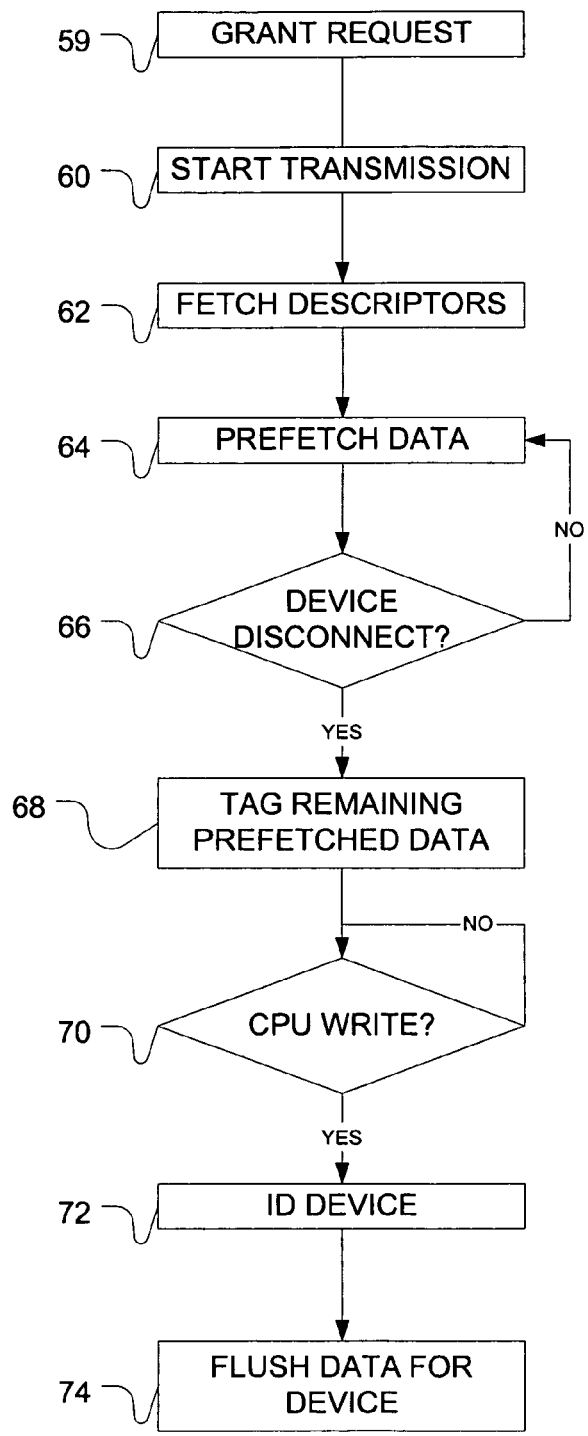
FIG. 4 shows a flowchart of another embodiment of a method for smart discard of prefetched data.

In another embodiment, more than one device on the expansion bus is assumed as shown in FIG. 4. If only one device exists, this particular embodiment would not be very useful, as it would add overhead to the tagging process not required for one device. In this embodiment of the method, the bridge is also the bus arbiter for the secondary or expansion bus. The arbiter, in this case the bridge must first grant a request to the device read data at 59. This ensures that the bridge knows the identity of the device making the read request from memory, as it will be the bridge granting the request at 59, prior to the start of data transmission.

Transmission starts at 60 and the descriptors are fetched at 62. The data is prefetched at 64 and is continued to be prefetched until a device disconnecting event occurs at 66. When the disconnect occurs, the remaining prefetched data is tagged at 68, with the tag in this embodiment being a device identifier and the start address of any remaining prefetched data.

In addition, the bridge should provide windows for each device up to a maximum of devices supported by the bridge.

These windows would be similar to the base address register/limit register in the device's PCI header and are programmed with exactly the same values. This assists the bridge in identifying the device to which the CPU is writing. On a write from the CPU at 70, the bridge identifies the device to which the CPU is writing at 72. The data prefetched previously for that device alone is flushed at 74. Data prefetched for other devices is retained.

In this manner, a better discard mechanism for prefetched data on bridges is found. It reduces the latency on data fetches from memory. It reduces the PCI load and improves efficiency, as well as increases that attainable bandwidth on high-speed interfaces. The reduced load on the memory system will have the indirect effect of decreasing the CPU time for memory accesses.

Figure 5:
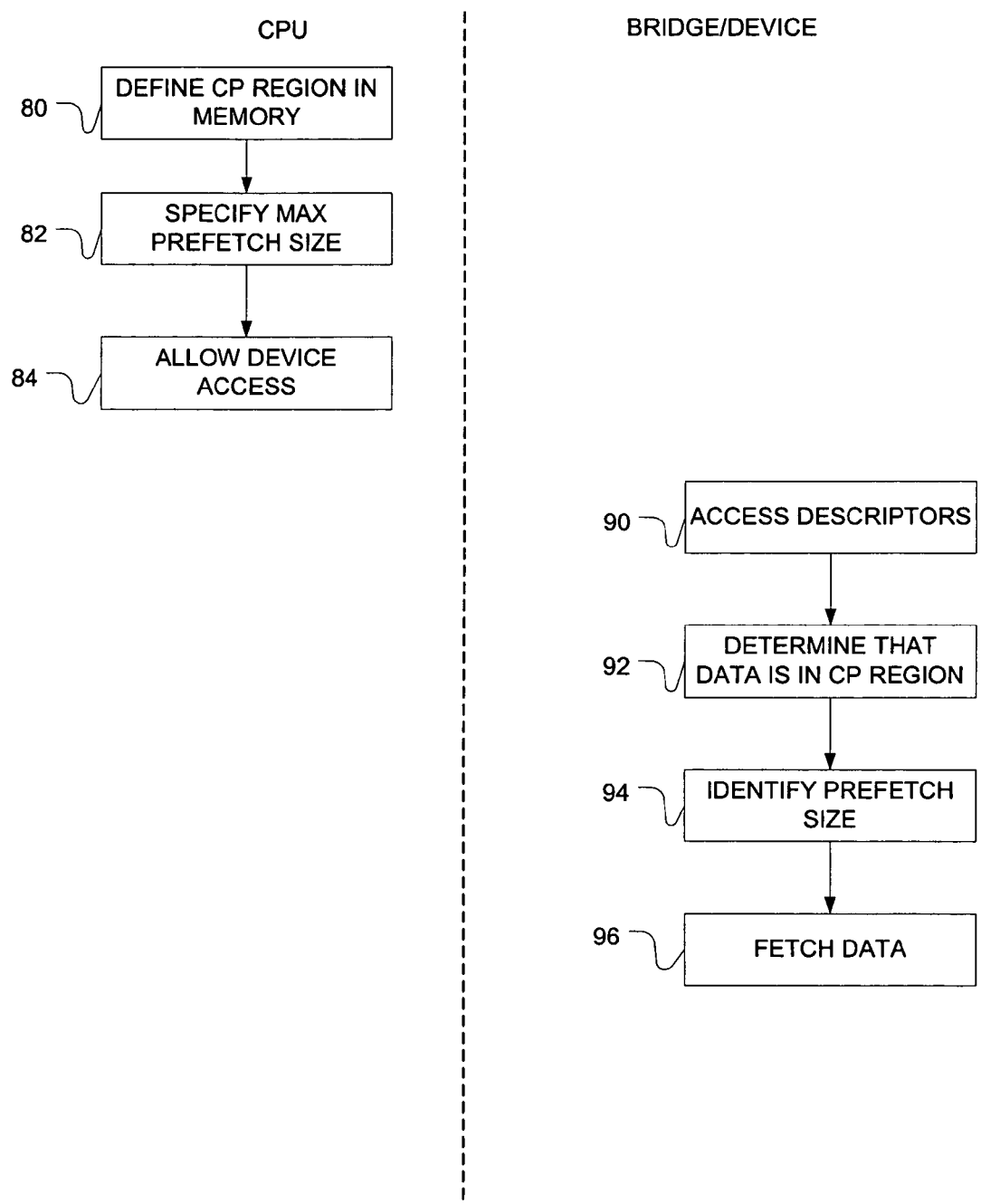
FIG. 5 shows a flowchart of an embodiment of method to control prefetch size in upstream memory transactions.

It is possible, using the memory configured as shown in FIG. 1, with a controlled prefetchable (CP) region, to also increase the efficiency and reduce the load on the memory system load in the downstream direction. A flowchart for such an alteration and its effect on downstream transactions is shown in FIG. 5. At 80, the CPU, system controller or memory controller defines a region in the memory that is 'controlled prefetchable.' The region is defined by a base address register (BAR) and a limit address register that reside in the bridge device. This region is used when a device accesses the memory for reading descriptors or packets. Any data accessed within this region has a predefined prefetchable size. A maximum prefetchable size is defined at 82. At this point, the memory is available for access at 84.

When the device is notified of a packet to be transmitted, for example, or any other event that requires the device to access the memory, the device accesses the descriptors at 90. The bridge then determines that the data is in the controlled prefetchable region at 92. At 94, the device or the bridge identifies the prefetch size and prefetches that amount of data starting at the provided data address at 96.

The bridge may determine that the data is in the controlled prefetchable region by the address of the data. The data in the memory region outside the controlled prefetchable region will have different prefetch size, which usually is programmable and larger than the prefetch size for the controlled prefetchable region.

The advantage of specifying the prefetch size lies in the ability to tailor the prefetches. For example, the desired data to be prefetched may be a descriptor of 16 bytes. If the default prefetch size is 128 bytes, 112 bytes of that prefetch are not used resulting in loading the memory system. These additional 112 bytes of data transfer were unneeded. Reducing the memory system load and PCI bus load increases the CPU performance, as the CPU wastes cycles waiting on input/output from memory or from devices across the bus. Reducing the bus usage for transfers frees up bandwidth, speeding up these transactions, causing the CPU to waste fewer cycles.

While these techniques can be used individually, combining the selective smart discards with controlled prefetchable memory may offer the greatest gain in overall system performance. Current PCI devices do not support either selective smart discards or controlled prefetchable memory. Also, currently, most bridges are implemented as application specific integrated circuits (ASICs) and cannot be upgraded. However, the bridges that contain any programmable components such as general-purpose processors, could be upgraded with new instructions that, when executed, cause the bridge to implement the methods of the invention. These instructions may be made available on an article of machine-readable media, interpretable by the programmable component within the bridge. The details are implementation specific.

Thus, although there has been described to this point a particular embodiment for a method and apparatus for improving efficiency in systems using expansion busses and bridges, it is not intended that such specific references be considered as limitations upon the scope of this invention except in-so-far as set forth in the following claims.

What is claimed is:

1. A bridge device, comprising:
   a first port to allow the bridge device to communicate with other devices on an expansion bus;
   a second port to allow the bridge device to communicate with devices on a second bus;
   a memory to store data; and
   a processor to:
   prefetch data upon request from a device on the expansion bus;
   tag any remaining prefetched data with an identifier upon a disconnecting event; and
   retain the prefetched data until a discarding event occurs, wherein a discarding event includes:
   receiving a write request from a central processing unit on the primary bus;
   determining if the write request is for a device having a particular identifier; and
   discarding any prefetched data having that particular identifier as part of the tag for that prefetched data, if the write request is for a device having a particular identifier.

2. The bridge device of claim 1, wherein the expansion bus is a peripheral component interconnect bus.

3. The bridge device of claim 1, wherein the second bus is a peripheral component interconnect bus and the bridge device is a peripheral component interconnect to peripheral component interconnect bridge.

4. The bridge device of claim 1, wherein the second bus is a system bus and devices on the second bus include the central processing unit.

5. The bridge device of claim 1, the processor further to discard the data upon the occurrence of a discarding event.

6. The bridge device of claim 1, the bridge device to operate as a bus arbiter of the expansion bus.

7. The bridge device of claim 1, a discarding event further comprising one selected from the group comprised of: a device disconnect, a write from a central processing unit to a device on the second bus, a read request from the device that does not match a tag on the prefetched data, and an expiration of a discard timer.

8. A method of selectively discarding prefetched data, comprising:
   prefetching data across a primary bus for a device on a secondary bus;
   detecting an indication that a disconnecting event has occurred;
   tagging any remaining prefetched data remaining with an identifier;
   retaining the data;
   receiving a write request from a central processing unit on the primary bus;
   determining if the write request is for a device having a particular identifier;
   discarding any prefetched data having that particular identifier as part of the tag for that prefetched data, if the write request is for a device having a particular identifier.

9. The method of claim 8, tagging any prefetched data remaining with an identifier further comprising tagging the prefetched data with a tag of a start address for the remaining data.

10. The method of claim 8, the method further comprising:

receiving a read request from the device;

determining that an address in the read request matches a start address for the prefetched data; and delivering the data to the requesting device.

11. The method of claim 8, the method further comprising:

determining that the write request is for a device on the secondary bus; and discarding any remaining prefetched data for any device on the secondary bus.

12. The method of claim 8, tagging any prefetched data further comprising tagging any prefetched data with a tag of an identifier of the device on the secondary bus and a start address of the remaining prefetched data.

13. The method of claim 8, the method further comprising acting as a bus arbiter for the secondary bus.

14. The method of claim 13, the method further comprising issuing a grant for the device on the secondary bus, and using an identity of the device on the secondary bus from a grant request resulting in the grant to identify the device.

* * * * *